April 22, 1924.

G. H. LANG

EXCESSIVE SPEED INDICATOR

Filed Dec. 11, 1920  4 Sheets-Sheet 1

Inventor.
George H. Lang
by Heard Smith & Tennant.
Attys.

Inventor.
George H. Lang
by Heard Smith & Tennant.
Attys.

April 22, 1924.

G. H. LANG 1,491,308

EXCESSIVE SPEED INDICATOR

Filed Dec. 11, 1920    4 Sheets-Sheet 3

Inventor.
George H. Lang
by Heard Smith & Tennant
Attys.

April 22, 1924.
G. H. LANG
EXCESSIVE SPEED INDICATOR
Filed Dec. 11, 1920  4 Sheets-Sheet 4
1,491,308
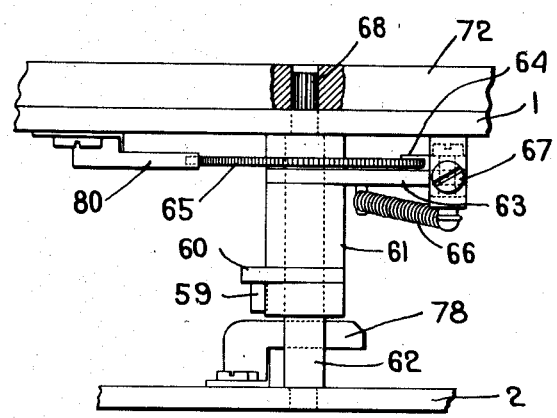
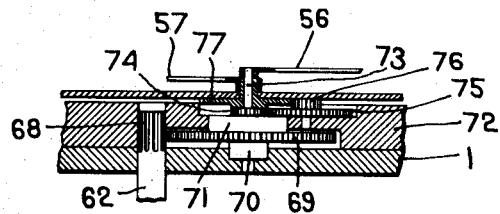
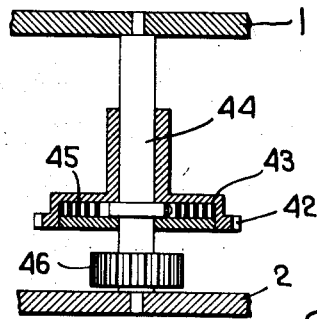
Inventor.
George H. Lang
by Heard Smith & Tennant.
Attys.

Patented Apr. 22, 1924.                                                          1,491,308

UNITED STATES PATENT OFFICE.

GEORGE H. LANG, OF BOSTON, MASSACHUSETTS, ASSIGNOR TO STOVER-LANG COMPANY, OF BOSTON, MASSACHUSETTS, A CORPORATION OF MASSACHUSETTS.

EXCESSIVE-SPEED INDICATOR.

Application filed December 11, 1920.   Serial No. 430,013.

*To all whom it may concern:*

Be it known that I, GEORGE H. LANG, a citizen of the United States, resident of Boston, county of Suffolk, State of Massachusetts, have invented an Improvement in Excessive-Speed Indicators, of which the following description, in connection with the accompanying drawing, is a specification, like characters on the drawing representing like parts.

This invention relates to speed indicators such as are used for indicating the speed of rotation of a shaft, the speed of an automobile, the speed of a vessel etc. and it has for its main object to provide an improved speed indicator with means which will indicate the extent or amount, either in terms of time or in terms of distance, that the indicator indicates a speed in excess of a pre-determined speed.

A speed indicator embodying my invention is capable of a wide range of use whereever it is desirable to keep track of the time or distance during which the shaft or other device to which the speed indicator is attached has been running at an excessive speed. Merely as illustration of one of its many uses I would refer to the use of the indicator in connection with motor trucks. When used in this way the speed indicator will of course indicate the speed at which the truck is operating and will in addition indicate either the total time or the total distance during any trip that the engine of the motor truck has been running at a speed above a pre-determined speed or at an excessive speed.

I accomplish this object by providing a time-telling or a distance-telling mechanism which is normally inoperative but which becomes operative as soon as the speed indicator indicates an excessive speed, and which remains operative to measure the passage of time or the distance travelled so long as such excessive speed is maintained but which becomes inoperative again as soon as the indicator indicates a speed less than the pre-determined excessive speed. Where my invention is applied to a motor truck therefore it is possible for the owner of the truck to read from the instrument at the end of any day just what length of time during the day the motor truck has been operating at an excessive speed or the distance which said truck has travelled at an excessive speed.

The above reference to the use of the invention in connection with a motor truck is merely for the sake of illustration as I wish to state that the invention is equally applicable to speed indicators for measuring the speed of any other object or mechanism than a motor truck. As stated above my invention contemplates a device which is adapted to either indicate the time during which the automobile or other machine has been operating at an excessive speed or the distance during which such automobile or other device travels at an excessive speed.

In order to give an understanding of my invention, however, I have chosen to illustrate in the drawings a construction which is adapted to indicate the amount of excessive speed in terms of time rather than distance but I do not wish to be limited to the measurement of this excessive speed in terms of time.

Fig. 7 is a view of the actuating means for the time mechanism.

Fig. 8 is a section on the line 8—8, Fig. 2.

Fig. 9 is a detail of the driving means for the escape.

While my invention is capable of being applied to speed indicators of various types I have herein chosen to illustrate it as it would be in connection with a speed indicator of the type shown in my United States Letters Patent No. 1,128,695 dated February 16, 1915, and No. 1,204,459 dated November 14, 1916.

The speed indicators illustrated in said patents comprise a rotary driving member which is actuated from the machine or shaft the speed of which is to be determined and which is rotated at a speed proportionate to that of the machine, a positioning member which is periodically clutched to the driving member so as to be rotated forwardly thereby and then released and allowed to return to its initial position, an indicating member which is positioned periodically by the positioning member, and means operative to release the positioning member from the driving member at pre-determined time intervals. The machine shown herein has the above mentioned elements although they are constructed and mounted somewhat differently from what they are in the above mentioned patents.

Figure 1:
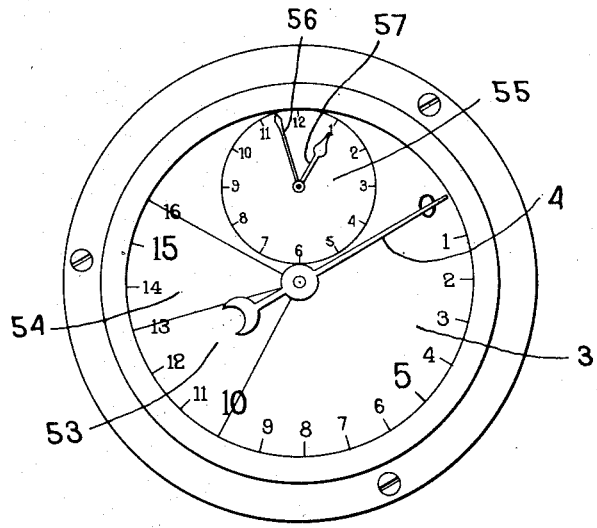
Fig. 1 is a front view of a speed indicator embodying my invention.
Figure 2:
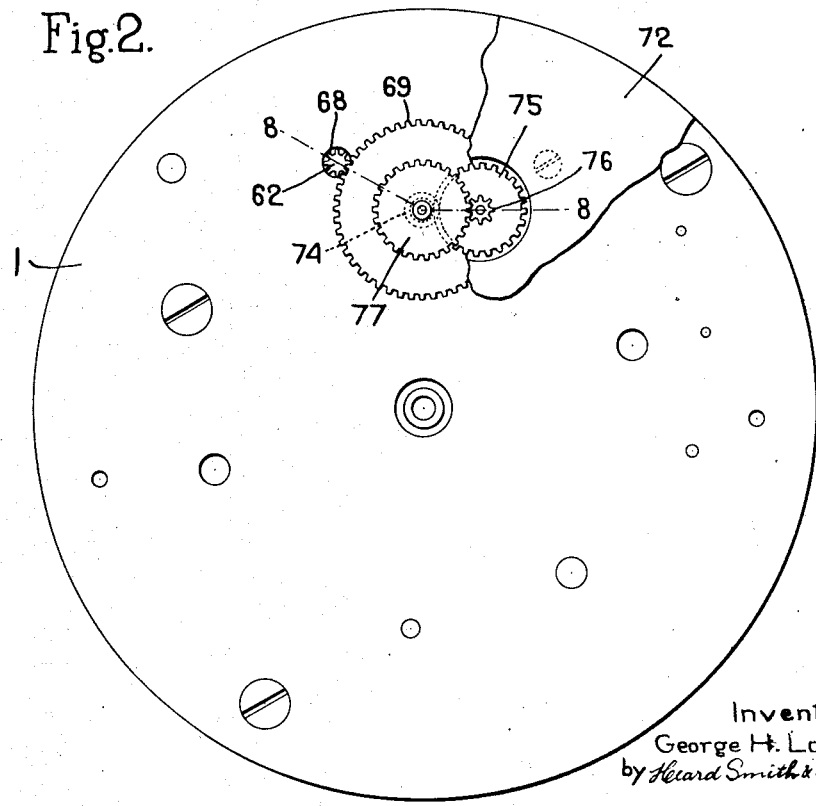
Fig. 2 is a view with the dial and part of the front plate removed to show the operation of the time-telling mechanism.
Figure 3:
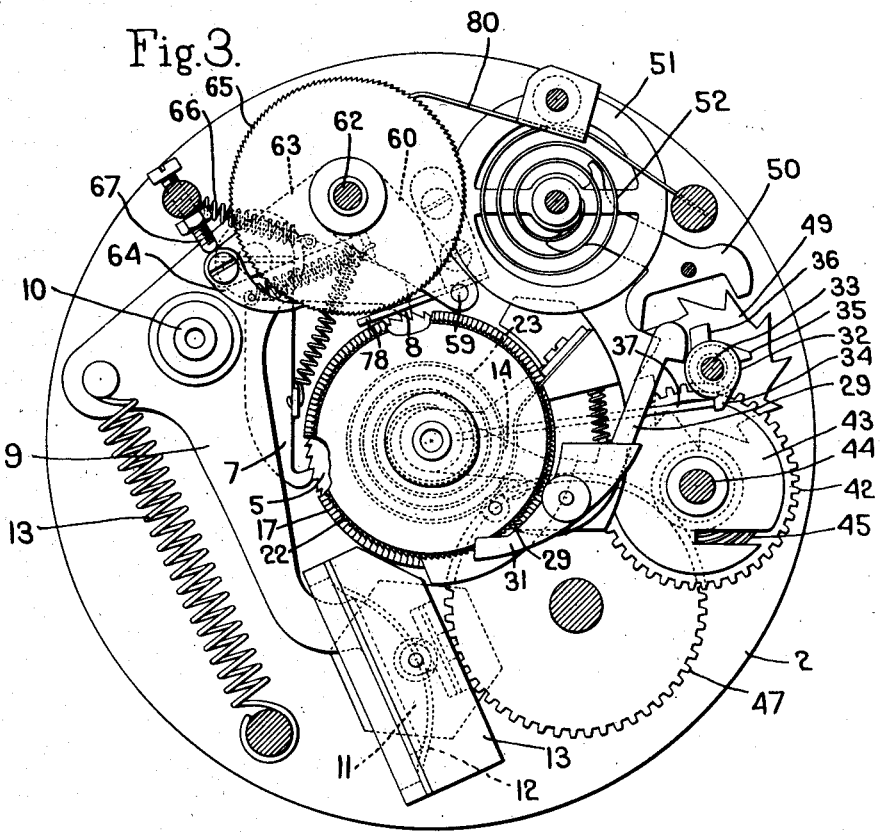
Fig. 3 is a view of the mechanism of the speed indicator.

The operative parts of the device are carried by a frame comprising two connecting plates 1 and 2. This frame with the mechanism supported thereby will preferably be confined in a suitable casing which carries the exposed dial 3 graduated to indicate speed. The speed is indicated by a pointer 4 which is moved over the dial and which assumes a position on the dial corresponding to the speed at which the machine or shaft to which the speed indicator is connected is operating. In Fig. 1 the dial is graduated so that each graduation mark indicates 100 revolutions. The driving member is indicated at 5 and is in the form of a ratchet wheel that is loosely mounted upon a stud 6 carried by the plate 2. This driving member is rotated forwardly by means of two pawls 7 and 8 that are pivotally mounted on rocking lever 9. This lever 9 is pivoted to the plate 2 at 10 and it has at one end a head 11 that engages a diaphragm 12 forming one side of an air chamber 13 that is adapted to receive air impulses all as described in my above mentioned patents. Such air impulses are produced by an impulse producer associated with the machine the speed of which is to be determined and the construction is such that the rapidity with which the air impulses succeed each other is proportionate to the speed of the machine. Each air impulse will expand the diaphragm 12 thus moving it to the left Fig. 3 and swinging the lever 9 about its pivot 10. This movement operates through the pawl 8 to advance the driving member one step. As soon as the air impulse ceases, the spring 13 returns the lever to the position in Fig. 3 and the latter operates through the pawl 7 to continue the forward rotative movement of the driving member.

Figure 4:
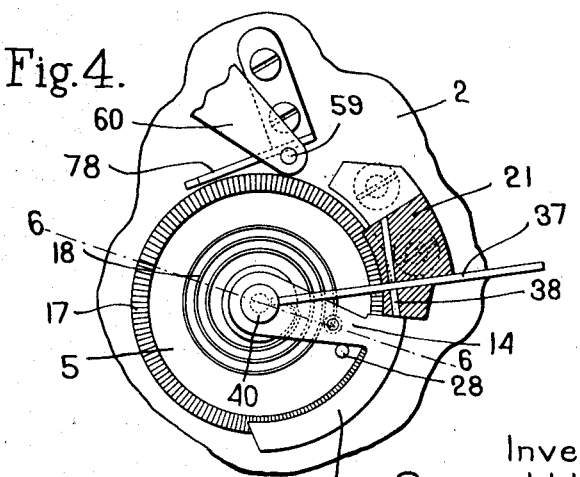
Fig. 4 is a fragmentary view of the driving member and positioning member.
Figure 5:
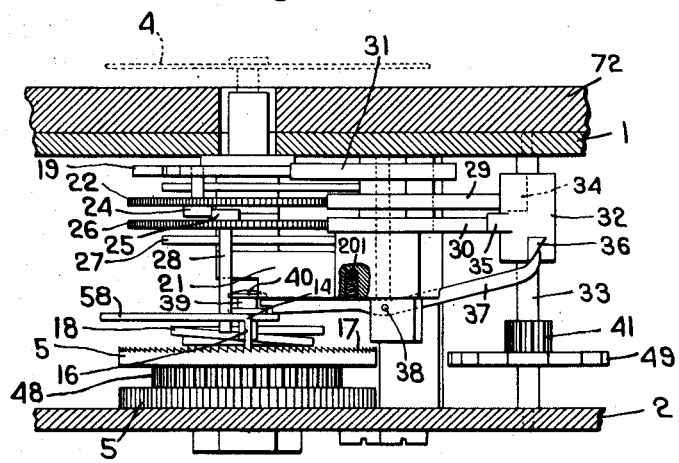
Fig. 5 is a view showing the driving member, the positioning member and associated parts in side elevation.
Figure 6:
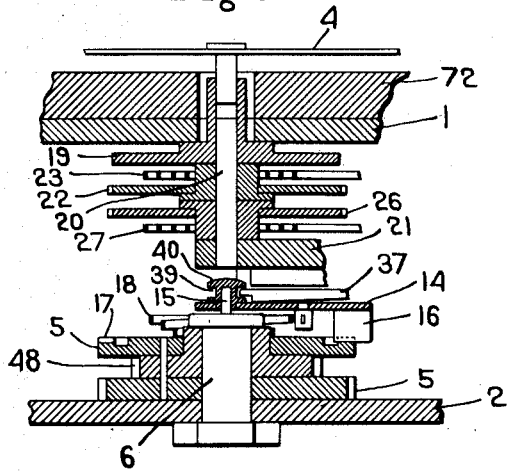
Fig. 6 is a section on the line 6—6, Fig. 4.

The positioning member is shown at 14 and it is in the form of an arm which is mounted on a pivot pin 15 extending from the end of the stud 6. Said arm has a depending flange 16 adapted to engage the face ratchet 17 formed on the driving member. Said arm is also acted upon by a spring 18 which tends to return it to initial position. Said flange 16 is yieldingly held in engagement with the ratchet 17 by the spring 201 which acts against the lever 37. So long as the positioning member is clutched to the driving member said positioning member will be rotated forwardly by the driving member but whenever the positioning member is disconnected from the driving member the spring 18 will return it to the position shown in Fig. 4. The positioning member is disconnected from the driving member periodically at pre-determined time intervals as described in my aforesaid patents.

The pointer 4 is removably carried by a disk 19 which is loosely mounted on a stud 20 that is supported in a bracket 21 carried by the frame. This disk 19 is connected to a toothed wheel 22 also loosely mounted on the stud 20 and acted upon by a return spring 23. The toothed member 22 is provided with a projection 24 adapted to be engaged by a projection 25 formed on another toothed member 26 also loosely mounted on the stud 20 and acted upon by the return spring 27. The toothed member 26 has an arm or pin 28 extending therefrom which is engaged by the positioning member 14. 29 and 30 are spring-pressed pawls which engage the toothed disks 22 and 26 and normally prevent their return movement and 31 is a spring-pressed pawl adapted to engage a notch in the disk 19 when the latter is in its zero position. These pawls 29, 30 and 31 are carried by the bracket 21.

The operation of the parts as above described is the same as that of the similar parts in my above mentioned patents. As the driving member rotates forwardly it carries with it the positioning member 14 and the latter acts on the arm 28 to rotate forwardly the toothed member 26. The toothed member 26 operates through the projections 25, 24 to rotate the toothed member 22 and the attached pointer 4. At the end of a pre-determined time interval, say two or three seconds, the positioning member is disconnected from the driving member and is allowed to return to zero position but through the action of the spring 201 at such time it is again coupled to the driving member and again moves forward during another interval of time at the end of which it is released again and so on. Just before the positioning member is released at the end of each time interval the pawl 30 is actuated to release the member 26, thereby to allow it to move backwardly by its spring 27 into a position determined by the positioning member, in which position it is held by the pawl 30 which has again become active. After the positioning member has been released at the end of each interval then the pawl 29 is released thereby allowing the communicating member 22 to assume a position determined by the member 26. The communicating member therefore is set at the end of each time interval which in a machine of this type will preferably be a matter of two or three seconds only.

The means herein shown for releasing the pawls and the positioning member are somewhat similar to that shown in my prior patents. This is accomplished by means of a cam member 32 which is mounted on a shaft 33 journalled in the plates 1 and 2 and which is rotated at a uniform rate. The cam has two cam projections 34 and 35 adapted to engage the end of the pawls 29 and 30 thereby to release the pawls from the toothed members 22 and 26. Said cam member is also provided with a cam projection 36 adapted to engage a lever 37 pivoted at 38 to the bracket 21 and having its free end received in a groove 39 formed in the hub 40 of the positioning member, so that when the outer end of the lever 37 is depressed by the cam projection 36 the inner end of said lever will be raised thereby lifting the positioning member out of engagement with the driving member. As stated above the lever 37 is acted on by the spring 201 which yieldingly holds the flange 16 in engagement with the ratchet 17.

The shaft 33 is driven from the driving member and for this purpose it has a pinion 41 thereon which meshes with a gear 42 formed on a spring housing 43 that is loosely mounted on a shaft 44. The spring housing encloses a spring 45, one end of which is secured to the shaft 44 and the other end of which has frictional engagement with the spring housing 43. The shaft 44 is provided with a gear 46 which meshes with and is driven by a gear 47 that in turn meshes with and is driven by a gear 48 fast to the driving member. The driving member therefore operates to wind up the spring 45 and the energy thus stored up is made effective to rotate the cam carrying shaft 33. The speed of rotation of the shaft 33 is regulated by an escapement device similar to that shown in my above mentioned patents and comprising an escapement wheel 49 fast on the shaft 33 and which cooperates with a pallet 50 and associated balance wheel 51 with its hair spring 52 to insure a uniform speed of rotation in the shaft 33.

The parts thus far described operate all as disclosed in said patents for the purpose of causing the pointer 4 to indicate on the dial the speed of the machine to which the device is attached.

I propose to form the dial 3 with a segment 53 of a distinct color and covering the graduated portion of the dial bearing the graduations indicating a speed just below the pre-determined excessive speed and also to form on the dial another segment 54 having a distinctive color bearing the graduations indicating the excessive speed. For instance in the illustration in Fig. 1 it is assumed that any speed above 1300 R. P. M., is an excessive speed and one at which it is dangerous or undesirable to operate the member or other machine to which the indicator is attached. In view of this assumption the dividing line between the segment 53 and 54 will be at the 1300 graduation mark and the segment 53 which is below this graduation mark may be of a green color while the segment 54 of this above said graduation may be of a red color. With this arrangement the operator will know that when the pointer of the indicator is over the green segment 53 that he is running his machine at a speed approaching the the predetermined limit which constitutes the excessive speed, and that when the pointer 4 is situated over the red segment 54 the machine is running at the excessive speed.

I have provided herein a time-telling mechanism which becomes operative whenever the pointer 4 passes into the excessive-speed area and which is constructed to indicate the total time during which the pointer 4 indicates an excessive speed. As a result if the speed indicator is attached to a motor truck, for instance, the owner can tell upon the return of the truck from any trip just how long during that trip the engine of the truck was operating at an excessive speed.

For thus indicating the time during which an excessive speed is indicated I have provided a time-telling device in the nature of a clock dial 55 and pointers 56 and 57 corresponding to the minute hand and hour hand of a clock or watch. This clock device is normally inoperative and will become operative to tell time only while the pointer 4 is indicating an excessive speed.

While any suitable means for operating the clock or time piece may be employed without departing from my invention I have herein chosen to use a mechanism which is actuated by the movements of the positioning member 14 and which is arranged so that whenever the positioning member has a movement of a pre-determined length during the two or three seconds time interval it will operate to give a forward movement to the hands of the time piece.

The positioning member is provided with a curved extension 58 which is adapted to engage a pin 59 carried by an arm 60 that is rigid with a sleeve 61 loosely mounted upon a shaft 62 journalled in the plates 1 and 2. This sleeve 61 has rigid therewith another arm 63 that carries at its end a spring-pressed pawl 64 which engages a ratchet wheel 65 fast on the shaft 62. The sleeve 61 with its arms 60 and 63 is acted upon by a spring 66 which normally holds the arm against an adjustable stop 67. Whenever however the positioning member 14 is turned through a sufficient arc to bring the extension 58 into engagement with the pin 59 the arm 60 and sleeve 61 will be rocked slightly thereby causing the pawl 64 to advance the ratchet wheel 65 one step, thus turning the shaft 62 a corresponding amount. The shaft 62 has teeth 68 cut in its upper end which teeth mesh with a gear 69 to which the minute hand is made fast. This gear 69 is provided with two hub parts 70, 71, one of which is journalled in the plate and the other of which is journalled in an opening formed in a plate 72 superposed on the plate 1 but detachably secured thereto. This hub 71 is provided with a spindle 73 on which the minute hand 56 is secured. The hub 71 has fast thereon a pinion 74 which meshes with a larger gear 75 journalled in the plate 72 and this larger gear has fast thereto a small pinion 76 which meshes with and drives a larger gear 77 loosely mounted on the spindle 73. The gear 77 has a hub projecting through the dial 3 and on which the hour hand 57 is mounted. The gearing 74 75, 76 and 77 constitutes a reducing gear to reduce the motion of the minute hand to that required by the hour hand as usual in time pieces.

With this construction it will be observed that whenever the shaft 62 is turned the time piece will be operated.

The extent of the arc through which the positioning member 14 is moved during each time interval depends upon the speed at which the machine is operated and the construction of the extension 58 and pin 59 is such that the positioning member is not carried far enough during any time interval for the extension to engage the pin so long as the speed of the device is below that indicated by the indication mark 1300. If the speed is greater than this or beyond the excessive speed then at each forward movement of the positioning member 14, the extension 58 thereof will engage the pin 59 thus oscillating the sleeve 61 and advancing the ratchet wheel 65 and shaft 62 one step.

In order that the time piece 56, 57 may accurately measure the time during which the pointer 4 is indicating the excessive speed it is necessary that the gearing which operates the shaft 62 should be so arranged that at each forward step of said shaft caused by the engagement of the extension 58 with the pin 59 said shaft will be advanced a distance corresponding to the time interval that the positioning device is coupled to the driving member before it is released. If for instance it is assumed that the positioning member will be released at every two second intervals then this gearing will be constructed so that each time that the positioning member engages the pin 59 the minute hand 56 will be advanced a distance equivalent to two seconds.

It will therefore be seen that this time piece will be operated only when the speed indicator is showing an excessive speed and therefore the device will always give a true communication as to the total length of time during which the speed has been excessive. 78 indicates a stationary cam member which is adapted to be engaged by the flange 16 when the positioning member has been carried sufficiently forward, said cam member operating to release the positioning member from the driving member. This cam is in the nature of a safety device to prevent the positioning member from being carried too far in case an exceptionally high speed is being recorded.

While in the above description I have set forth in detail one mechanism adapted to measure the excessive speed in terms of time yet I wish it to be understood that the invention is not limited to a device which will measure the excessive speed in time as the invention contemplates a device capable of measuring the excessive speed in any desired terms, such for instance, as distance travelled.

I claim:

1. In a speed indicator, the combination with means for indicating the speed of a driven member, of means to indicate visually the total elapsed time during which said member has been driven at a speed above a pre-determined speed.

2. In a speed indicator, the combination with means for indicating the speed of a driven member, of means actuated by said first named means to indicate the total elapsed time in any time interval during which said driven member has been driven at a speed above a predetermined speed.

3. In a speed indicator, the combination with means for indicating the speed of a driven member, of a time indicator adapted to indicate the passage of time, but which is inoperative when the speed indicator is indicating a speed below a predetermined speed, and means to render the time indicator operative when the speed indicator indicates any speed above said pre-determined speed.

4. In a speed indicator the combination with means to indicate the speed of a driven member, of a normally inoperative time indicator associated therewith and means to cause said time indicator to indicate the total time during which the speed indicator has been indicating a speed above a predetermined speed.

5. In a speed indicator the combination with means for indicating the speed of a driven member, of a time indicator to indicate the passage of time, and means to render the time indicator operative whenever the speed indicator indicates a speed above a pre-determined speed and to cause said time indicator to be inoperative whenever the speed indicator indicates a speed below said pre-determined speed.

6. The combination with a speed indicator to indicate speed, of a normally inoperative time indicator and means actuated by the speed indicator when it indicates a predetermined speed to render the time indicator operative.

7. The combination with a speed indicator, of means actuated thereby to indicate what portion of any time-interval the indicator has been indicating a speed above a predetermined speed.

8. In a speed indicator, the combination with a driven member, of a positioning member which is driven forward by the driving member during each of a plurality of successive time intervals and is allowed to return to zero position at the end of each time interval, an indicating member positioned by the positioning member and means actuated by the positioning member to indicate the time during which the indicating member has been indicating a speed above a predetermined speed.

9. In a speed indicator the combination with a driving member, of a positioning member which is driven forward periodically by the driving member, an indicating member which is positioned by the positioning member, a time indicator to indicate the passage of time, and means actuated by the positioning member whenever the indicating member is indicating a speed above a pre-determined speed to render the time indicator operative.

10. In a speed indicator the combination with a driving member, of a positioning member which is periodically driven forward thereby, an indicating member which is positioned by the positioning member, a normally inoperative time indicator to indicate the passage of time, and means actuated by the positioning member when the speed indicator is indicating a pre-determined speed to render the time indicator operative.

11. In a speed indicator the combination with a driving member of a positioning member periodically operated thereby, an indicating member which is positioned by the positioning member, a time indicator comprising an hour hand and a minute hand, and means actuated by the positioning member when the speed indicator is indicating a pre-determined speed to operate the time indicator.

12. In a speed indicator the combination with a driving member, of a positioning member which is driven forwardly thereby during each of a succession of time intervals and returns to zero position between said time intervals, an indicating member positioned by the positioning member, a time indicator for indicating the passage of time and comprising an hour hand and a minute hand, and means actuated by the positioning member at each forward movement thereof when the speed indicator is indicating a speed above a pre-determined speed to move the hands of the time indicator a distance to indicate a time interval equivalent to each of the first named time intervals.

In testimony whereof, I have signed my name to this specification.

GEORGE H. LANG.